Aug. 7, 1951      B. L. GADEBERG      2,562,905
MEANS FOR INCREASING LATERAL STABILITY OF AIRCRAFT
Filed Oct. 3, 1946
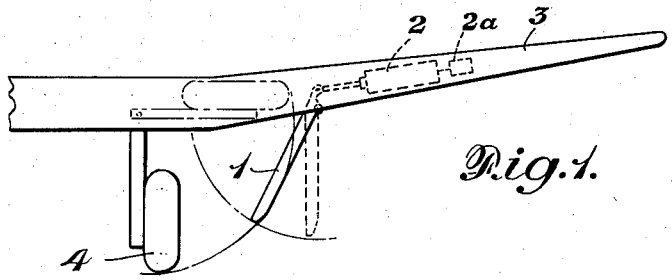
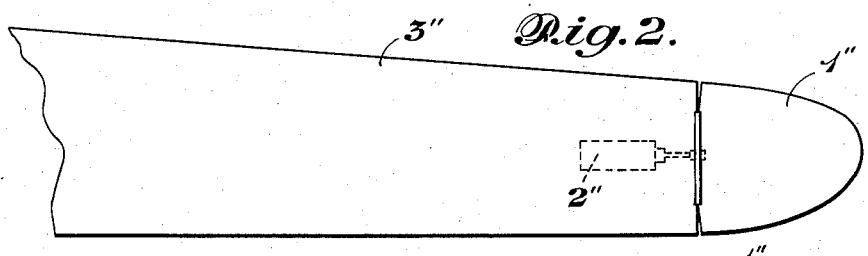
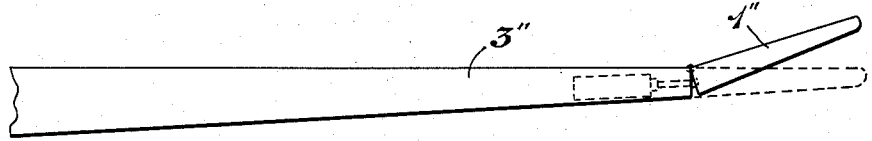
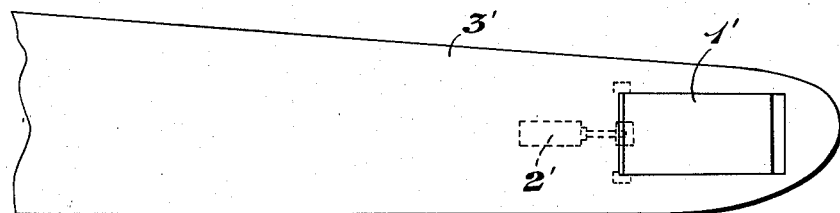
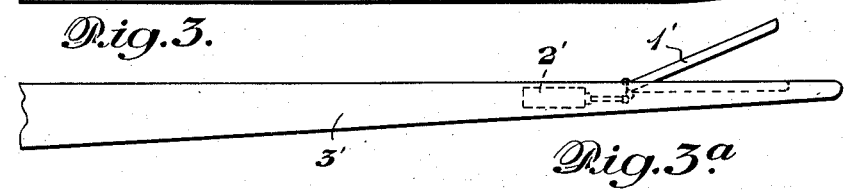
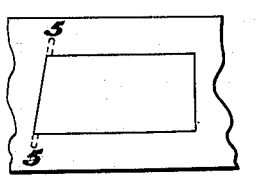
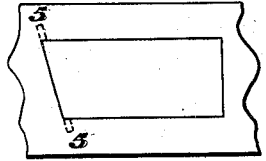
Inventor
Burnett L. Gadeberg Patented Aug. 7, 1951

2,562,905

UNITED STATES PATENT OFFICE 2,562,905

MEANS FOR INCREASING LATERAL STABILITY OF AIRCRAFT

Burnett L. Gadeberg, Berkeley, Calif.

Application October 3, 1946, Serial No. 701,040

1 Claim. (Cl. 244—91)

(Granted under the act of March 3, 1883, as amended April 30, 1928; 370 O. G. 757)

This invention is directed to means for increasing lateral stability of airplanes for certain conditions and particularly in the approach, landing, and wave-off conditions without increasing the lateral sensitivity in the high speed condition.

There has been a need for an auxiliary lifting device to augment the rolling moment due to sideslip at low speeds and which could be retracted or made ineffective at high speeds.

An object of this invention is to adapt landing gear fairing doors as auxiliary rolling devices.

Another object is to provide the wing of the airplane with special surfaces which can be faired into the wing.

Other objects will become apparent from a description of the following drawings in which Fig. 1 shows the auxiliary rolling device incorporated into the design as part of the landing gear fairing doors, said landing gear being shown in retracted position in dot-dash lines;

Figs. 2 and 2a show movable wings tips;

Figs. 3 and 3a show movable top surface doors;

Figs. 4 and 4a show the door hinge line on inclined axes to provide change in directional stability.

In Fig. 1 the rolling device acts as a well fairing door when the landing gear is fully retracted. Door 1 is activated by a hydraulic strut or electric motor 2 (shown diagrammatically) or any other device similar to the gear activating mechanism used on the particular airplane. By the use of a simple sequence valve or switch 2a, the door opens fully when landing gear 4 is extended and then is partially retracted or toed in as shown, after the gear has been fully extended to the optimum position where the maximum rolling effect is obtained. When the gear 4 is retracted, the sequence operates in reverse. Activating motor and piston 2 and sequence valve 2a are suitably mounted in wing 3.

If the directional stability of the airplane on which the auxiliary rolling device is installed is deficient or excessive in landing, approach, or wave-off conditions, the hinge line 5—5 of the auxiliary rolling doors may be toed in or out to help alleviate this condition as shown diagrammatically in Fig. 4 or 4a.

The change in directional stability is due to the differential drag characteristics of the doors when the air plane is sideslipped. As shown in Fig. 1, such auxiliary lift device could be fashioned from the existing gear fairing doors which are presently installed on the airplane. These doors could be easily converted into airfoil shapes if so desired and arranged to produce a positive $\Delta C_{L_\beta}$ in the approach and landing conditions when extended; where $C_L$=rolling moment coefficient and $\beta$=angle of side slip, whereby $C_{L_\beta}$=slope of the curve of rolling moment coefficient plotted against angle of side slip.

Recent flight tests on a 11½° dihedral airplane have shown that the effect of the present doors on $C_{L_\beta}$ is negligible. This is probably due to the fact that the positive $\Delta C_{L_\beta}$ attributable to the change in pressure distribution of the wing due to the presence of the doors in sideslips is balanced by a negative $\Delta C_{L_\beta}$ due to the direct rolling moment of the doors in sideslips due to their position below the center of gravity. In order to produce a positive $\Delta C_{L_\beta}$ by use of the doors, it is suggested that the doors be toed in at the bottom and toed in or out at their leading edges as the case may require. The toeing in of the bottoms of the doors will increase the positive portion of $\Delta C_{L_\beta}$ and decrease the negative portion of $\Delta C_{L_\beta}$ due to the presence of the doors when the airplane is sideslipped. The leading edges of the doors may be toed in either in or out according to the desire to increase or decrease the static directional stability of the airplane in the approach and landing conditions.

Toeing the doors in at the bottom is a relatively simple matter and may be accomplished on the airplane by the use of a sequence valve which partially retracts the doors after the landing gear has been fully extended. Toeing the leading edges of the doors in or out may be accomplished by setting the hinge axes of the doors at an angle to the longitudinal axis of the airplane as shown in Figs. 4 and 4a. If it is found impracticable to change the position of the hinge axis, and if it is found desirable to change the static directional stability in the approach and landing conditions, the same effect may be accomplished by the use of flaps on the trailing edges of the fairing doors. These could easily be connected by a mechanical linkage to provide the proper flap deflection at the required door position.

A simplified analysis has been made of the effect that may be expected from the doors on $C_{L_\beta}$. This analysis shows that $$C_{L_\beta} = 2\left[\frac{dC_{L_1}}{d\alpha_1}\right]\frac{S_1}{S}\left[\frac{y}{b}\sin\gamma\cos\gamma - \frac{b_1}{2b}\cos\gamma\right]$$

and that the door angle at which $C_{L_\beta}$ is a maximum is $$\gamma = \sin^{-1} \tfrac{1}{2}\left[\frac{b_1}{4y} \pm \sqrt{\left(\frac{b_1}{4y}\right)^2 + 2}\right]$$

where $b_1$ span of one door, ft.
$b$ wing span of airplane, ft.
$S_1$ area of one door, ft.$^2$
$S$ wing area of airplane, ft.$^2$
$y$ spanwise position of door hinge axis, ft.
$\gamma$ door angle relative to airplane plane of symmetry.
$\dfrac{dC_{L_1}}{da_1}$ slope of lift curve of door.

These equations show that for the size of door at present installed on the airplane, assuming a symmetrical airfoil section, the optimum door angle should be 47.2° and that for this position the change in $C_{L_\beta}$ due to the doors will be .1128/radian 7½° (for the dihedral wing, $C_{L_\beta}$, due to the wing alone, has been shown to be approximately .0825/radian). This is an effective increase of 1.03° dihedral which should produce approximately 1.7° per second of roll in a 10° sideslip at 100 M. P. H. If the doors could be extended 1.9 feet in span, which appears possible from an inspection of the airplane, these values could be raised to 2.65° of dihedral and 4.25° per second of roll. Although the calculated effect of doors of the size now installed on the airplane is not as great as desirable, the doors on certain planes could easily be extended to produce greater effect, and airplanes in the design stage could have sufficiently large doors provided to give the desired effects. Since this analysis has been necessarily simple, it is possible that the actual effect may be more or less than those calculated.

It is apparent that the auxiliary rolling surface may fair into either upper or lower surfaces of the wing. In Figs. 3 and 3a, the rolling surface consists of doors 1' which fair into the upper surface of wing 3' and are operated by suitable mechanism 2' shown diagrammatically. Door 1' can be extended into operative position as shown in Fig. 3a.

In Figs. 2 and 2a, doors 1" become wing tips which are hinged to wing 3" and operated by suitable mechanism 2".

The scope of the invention should be interpreted in the light of the following claim. In certain cases it may be desirable to have special flap surfaces built into the trailing edge of the door.

The invention described herein may be manufactured and used by or for the Government of the United States of America for governmental purposes without the payment of any royalties thereon or therefor.

What is claimed is:

An aircraft including a landing gear, a wing having a landing gear well entirely within said wing and adapted to receive said landing gear in its retracted position, a combination well cover and auxiliary airfoil member mounted on the wing adjacent said well, said member being pivotally secured to the wing independently of the landing gear and having its chord substantially parallel to the flight axis of the aircraft, said member dimensioned and shaped at least on one side to close the landing gear well in the wing of the aircraft without changing the aerodynamic characteristics of the wing, and controllable motor means in said aircraft operatively connected to said member for moving said member from the well-closing position to positions below said wing for increasing the lateral stability of the aircraft.

BURNETT L. GADEBERG.

REFERENCES CITED

The following references are of record in the file of this patent:

UNITED STATES PATENTS

| Number | Name | Date |
|---|---|---|
| 1,495,031 | Muzik | May 20, 1924 |
| 1,768,878 | Bauer | July 1, 1930 |
| 1,927,309 | Dichman | Sept. 19, 1933 |
| 1,947,461 | DePort | Feb. 20, 1934 |
| 2,120,760 | Lumiere | June 14, 1938 |
| 2,122,214 | Reid | June 28, 1938 |
| 2,222,975 | Brown | Nov. 26, 1940 |
| 2,418,301 | Heal | Apr. 1, 1947 |

FOREIGN PATENTS

| Number | Country | Date |
|---|---|---|
| 406,636 | Great Britain | Feb. 1, 1937 |